July 25, 1967  G. E. OSTERSTROM  3,332,610

SHAFT SEAL WITH COOLING MEANS

Filed Sept. 8, 1965  2 Sheets-Sheet 1

INVENTOR
GORDON E. OSTERSTROM
BY
Greist, Lockwood, Greenawalt & Dewey
Attys.

July 25, 1967  G. E. OSTERSTROM  3,332,610

SHAFT SEAL WITH COOLING MEANS

Filed Sept. 8, 1965  2 Sheets-Sheet 2

INVENTOR
GORDON E. OSTERSTROM
BY
Greist, Lockwood, Greenawalt & Dewey
Attys.

United States Patent Office 3,332,610
Patented July 25, 1967

3,332,610
SHAFT SEAL WITH COOLING MEANS
Gordon E. Osterstrom, Winnetka, Ill., assignor to The Welch Scientific Company, Skokie, Ill., a corporation of Illinois
Filed Sept. 8 1965, Ser. No. 485,902
2 Claims. (Cl. 230—116)

This invention relates to shaft seals in general and more particularly is directed to a face type shaft seal having a novel cooling arrangement. One face of the seal is formed by a radial surface on a rotating turbine wheel and co-operates with a stationary face ring carried by the housing supporting the shaft on which the turbine wheel is mounted. The fluid driving the turbine is adiabatically expanded in the nozzle to reduce the temperature, which in turn maintains the temperature of the turbine wheel at a low level to provide good cooling at the sealing faces since the sealing circle is of a diameter which approximates the effective diameter of the turbine wheel.

In turbo-molecular pumps, centrifuges and like equipment, shaft speeds of the order of 36 to 100 thousand r.p.m. are not uncommon. Quite obviously, such speeds generate heat in parts which are in rubbing engagement. Dissipation of this heat becomes a problem, particularly in the former application where the chamber on one side of the seal is exposed to a vacuum. In such event, only the chamber on the other side of the seal is available to dissipate the heat generated so much be doubly efficient. The importance of cooling is best appreciated when one considers that oil and other lubricants will carbonize when elevated temperatures are reached and the particles or residue can cause scoring of the precision lapped surfaces with an ultimate loss in sealing efficiency.

The present invention is directed to a novel sealing arrangement wherein the fluid which drives the shaft is adiabatically expanded in the nozzle to lower its temperature and is then directed to a turbine which drives a shaft and also forms a part of the shaft seal. The sealing circle on which the faces engage approximates the effective diameter of the turbine wheel so that the driving fluid serves to cool the co-operating elements immediately adjacent the sealing faces. In this manner the temperature of the seal may be maintained at a level where the lubricant can keep the frictional forces at a minimum.

A better understanding of the present invention may be had by a consideration of the objects achieved and a detailed description of a preferred embodiment.

It is an object of this invention to provide a new and improved shaft seal with a novel cooling means.

It is a further object of this invention to provide a novel drive and sealing means for high speed pumps, centrifuges and the like.

It is a further obect of this invention to provide a new and improved shaft seal formed by a face ring engaging a side portion of a turbine wheel with the sealing circle being of a diameter which approximates the diameter of the turbine wheel.

Further objects will become apparent to the man in the art who studies the drawings and reads the description.

Figure 1:
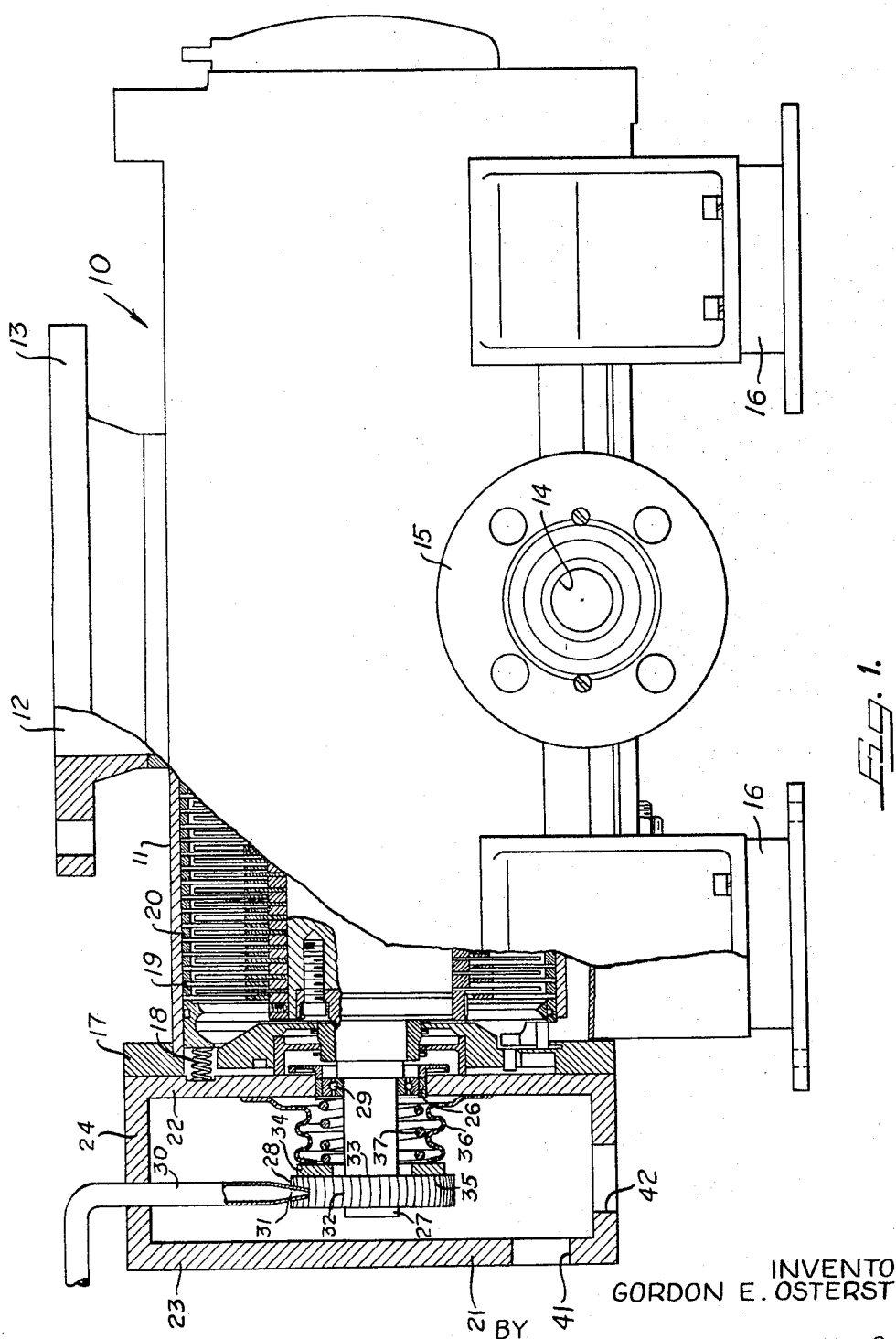
FIG. 1 is a fragmentary, partly sectioned, elevational view of a molecular pump having the turbine drive and sealing arrangement shown in cross section at the left hand portion.

FIG. 1 illustrates a pump 10 of the type which is capable of operation in the free molecular range as disclosed in United States Patent 2,918,208, issued December 22, 1959. The pump 10 includes a cylindrical housing 11 having a centrally located inlet 12 defined by a flanged fitting 13, the latter being adapted for connection to an outlet 14 is located at the lower portion of the pump having a similar flange fitting 15 to facilitate connection to a discharge line or the like. Suitable supports 16 are provided along the lower portion of the cylindrical housing 11 and permit the mounting of the pump on an appropriate surface. An end plate 17 closes off the end of the left-hand end of the housing 11 and has a bias means 18 positioned therein which urges stator rings 19 and spacers 20 into tightly stacked engagement as shown. The detailed features of this construction may be found in the above mentioned patent and the Patent No. 3,189,264 issued June 15, 1964. Attached to the end plate 17 is an annular housing 21 having an inner wall portion 22, outer wall portion 23 joined by a cylindrical wall portion 24. The inner wall portion 22 is provided with an opening 26 through which a shaft 27 projects. Mounted on the shaft 27 is a turbine wheel 28 which is designed to rotate the shaft and rotor elements of the pump.

Figure 2:
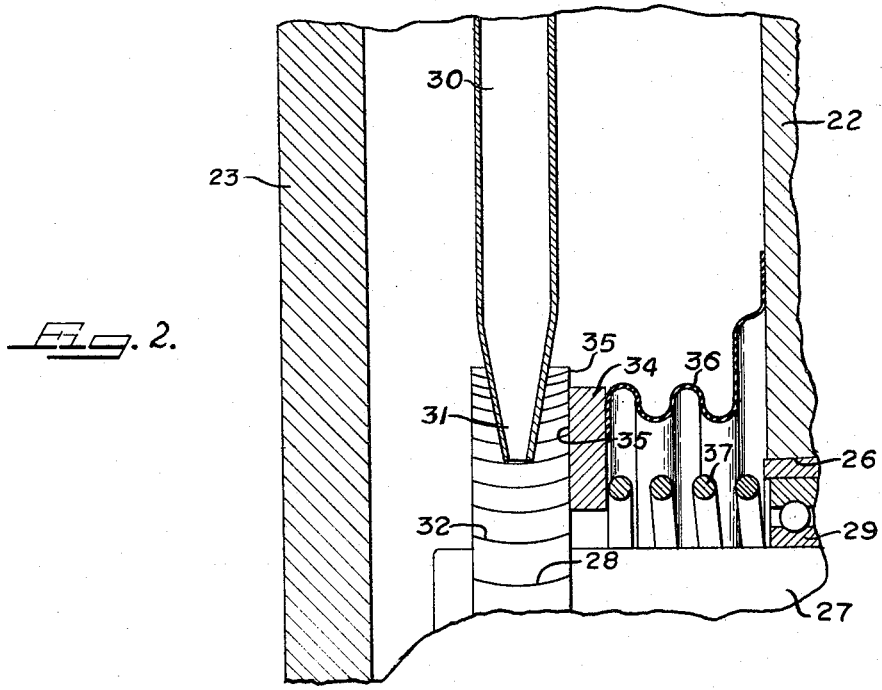
FIG. 2 is an enlarged half sectional view of the left-hand portion of FIG. 1 with the shaft being illustrated in full lines.
Figure 3:
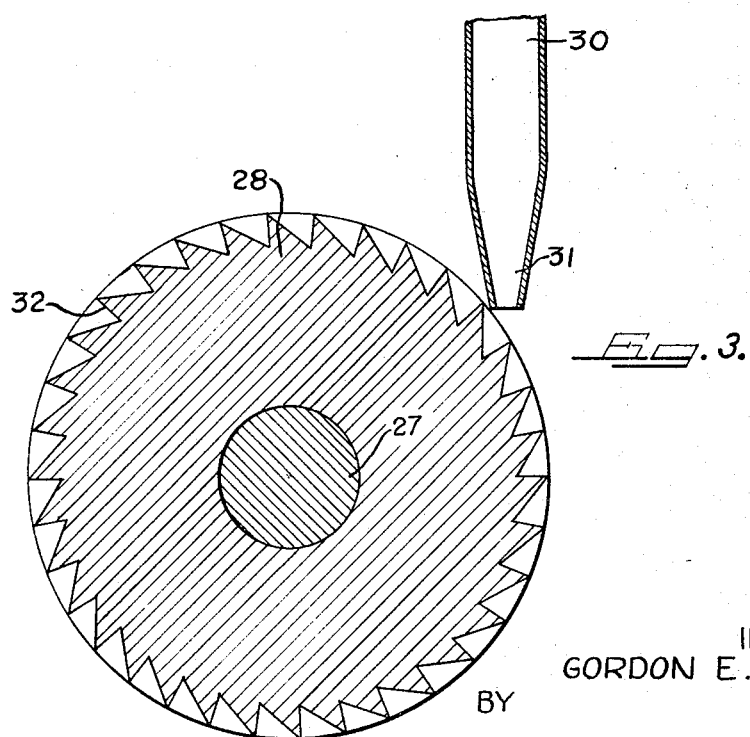
FIG. 3 is a cross sectional view taken generally along the lines 3—3 of FIG. 2.

As seen in FIGS. 1 and 2, the shaft 27 is supported by a suitable anti-friction means in the form of a ball bearing 29 as it passes through the inner wall 22. On the outer end of the shaft 27 the turbine wheel is mounted for free rotation with the shaft 27 within the housing 21. A fluid supply 30 terminates in a nozzle 31 adapted to release motive fluid onto the turbine wheel. As seen in FIG. 3, the teeth or buckets 32 on the turbine wheel are generally cup-shaped in axial cross section while in transverse cross section the teeth or bucket portions 32 assume a generally sawtooth configuration. Obviously, any desired configuration may be used so long as it conforms to the description below.

A radially extending surface 33 is formed on one side of the turbine wheel 28 to provide a rotary sealing face portion. Co-operating with this sealing face is a stationary face seal ring member 34 having a radial sealing surface 35 co-operating with the radial surface 33 to form a fluid-tight seal. While the ring 34 is shown to be a relatively wide radial dimension to provide a wide sealing face, it is to be understood that the face may be undercut or relieved to limit the contact between the faces 33 and 35 to a sealing circle of limited radial extent. Such sealing circle has a diameter which approximates the diameter of the effective portion or buckets 32 on the turbine wheel 28. A flexible bellows 36 or similar flexible element is attached to the sealing ring 34 at one end and at the opposite end is joined to the inner wall 22 of the housing 21 in a fluidtight manner. Obviously, any form of means which will fluidtightly and non-rotatably carry the sealing ring 34 with the housing 22 is equally well suited for this particular application. A biasing means in the form of a spring 37 acts against the inner wall 22 of the housing 21 and against the ring 34 to urge it into sealing contact with the radial face 33 on the turbine wheel 28.

In operation, the fluid is fed through the line 30 to the nozzle 31 where it is adiabatically expanded to lower the temperature of the same. As the fluid impinges on the turbine wheel, rotation occurs causing the shaft 27 to rotate within the bearing 29 to drive the rotary blades on the pump. Accordingly, relative rotation between the stationary face ring 34 and radial face 33 on the turbine wheel 28 also occurs to provide a dynamic seal between the pump chamber and atmosphere. A suitable lubricant may be provided for the sealing faces or the sealing face may be formed or treated with a material having a low coefficient of friction such as Teflon or the like. The ring 34 is maintained in tight engagement with the radial face on the turbine wheel 28 through the action of the spring 37 while the bellows 36 seals the stationary ring 34 to the housing 22. As the motive fluid strikes the turbine 28, a portion may be deflected laterally to the area immediately adjacent the outside diameter of the stationary face ring 34 to cool the outer surface of ring 34 and flexible bellows 36. The action of the cooling fluid on the buckets 32 of the turbine 28 causes the turbine wheel to be maintained in a cooled condition so that the radial surface 33 is relatively cool also. Thus the sealing circle or circle of contact of the sealing faces will be maintained in a relatively cooled condition. In the pump application shown, little or no cooling is experienced within the bellows 36 since the surrounding medium contains little or no fluid to carry away the heat. Accordingly, the entire cooling effect occurs externally of the seal on the atmospheric side and is provided by the fluid which drives the molecular pump 10.

If desired, suitable heat exchange means may be carried on the face ring 34, and as previously pointed out the area of face contact may be limited to any desired degree which will provide good sealing efficiency. It is contemplated that the driving or motive fluid will be discharged from the jet nozzle at subsonic or supersonic velocities by appropriately shaping the nozzle. Also, the driving fluid may contain oil in the form of mists in a quantity of about 0.01–0.05% by weight to provide cooling and lubrication. Pressure of the driving fluid may run of the order of 100 p.s.i. and in one embodiment rotor diameters between 1 and 3 inches have been used with success. The sealing faces may be formed from any desired material such as carbon, stellite, tool steel, stainless steel, ceramic or the like. The nozzle can discharge the fluid onto the turbine by either axial or tangential or radial flow depending on the environment, power required and the like. An additional bearing may be provided in the outer wall 23 if desired, however, in the design shown, satisfactory performance has been achieved without an additional bearing. When the fluid is expanded within the housing it may be discharged within suitable outlet portions 41 and 42 provided at appropriate spacing around the housing 21. Obviously, the fluid may be returned for recompression and used again if desired by connecting the outlet portions 41 and 42 to the inlet side of the compressor.

Upon a consideration of the foregoing, it will become obvious to those skilled in the art that various modifications may be made without departing from the invention embodied herein. Therefore, only such limitations should be imposed as are indicated by the spirit and scope of the appended claims.

I claim:

1. In combination, a turbo-molecular pump and a driving and sealing means therefor, said turbo-molecular pump having a housing, a shaft projecting from said housing, a turbine wheel mounted on said shaft for rotationally driving the same, said turbine wheel having a plurality of blade means disposed around a peripheral portion thereof and having a generally radially extending surface formed at one side immediately adjacent said blade means, a nozzle for directing fluid onto said blade means whereby said shaft will be rotated, said sealing means including a stationary face ring fluidtightly joined to said housing and sealingly contacting said radially extending surface on a sealing circle which approximates that of said blade means whereby said fluid expanding in the region of said blade means will simultaneously cause cooling of said seal.

2. In combination, a housing, a turbine wheel having a plurality of blade means peripherally on said wheel, a shaft rotatably mounted in said housing and having a portion thereof adapted for mounting said turbine wheel thereon, a nozzle disposed closely adjacent said turbine wheel periphery for adiabatically emitting fluid onto said blade means on said turbine wheel thereby to drive the same, a generally radially extending surface on one side of said turbine wheel forming an annular sealing surface, said sealing surface overlying an end portion of the blade means and having a diameter approximating that of the effective diameter portion of said blade means on said turbine wheel, and a co-operating sealing ring resiliently biased into fluid-tight engagement with said sealing surface along a sealing circle having a diameter approximating that of the effective diameter portion of said blade means whereby fluid adiabatically released in said nozzle onto said blade means to drive said turbine wheel will also maintain said sealing surfaces cooled.

References Cited

UNITED STATES PATENTS

| 1,127,678 | 2/1915 | Rector | 253—134 |
| 2,392,124 | 1/1946 | Denys | 103—111 |
| 2,842,063 | 7/1958 | Kishline et al. | 103—11 |
| 2,851,289 | 9/1958 | Pedersen | 253—39 |

DONLEY J. STOCKING, *Primary Examiner.*

HENRY F. RADUAZO, *Examiner.*